(12) United States Patent
Kuroe et al.

(10) Patent No.: US 8,550,491 B2
(45) Date of Patent: Oct. 8, 2013

(54) AIRBAG DEVICE FOR STRADDLE TYPE VEHICLES

(75) Inventors: Takeshi Kuroe, Wako (JP); Seiji Hanafusa, Wako (JP); Keishi Yokota, Tokyo (JP); Kazutaka Sugimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 13/203,245

(22) PCT Filed: Jun. 17, 2010

(86) PCT No.: PCT/JP2010/060307
§ 371 (c)(1),
(2), (4) Date: Aug. 25, 2011

(87) PCT Pub. No.: WO2010/147186
PCT Pub. Date: Dec. 23, 2010

(65) Prior Publication Data
US 2011/0309602 A1 Dec. 22, 2011

(30) Foreign Application Priority Data
Jun. 18, 2009 (JP) .................................. 2009-145709

(51) Int. Cl.
*B60R 21/20* (2011.01)

(52) U.S. Cl.
USPC .................................... 280/728.3; 280/728.2

(58) Field of Classification Search
USPC ............................... 280/728.3, 733; 180/274
See application file for complete search history.

(56) References Cited

U.S. PATENT DOCUMENTS

| | | | | |
|---|---|---|---|---|
| 5,072,967 A | * | 12/1991 | Batchelder et al. | 280/732 |
| 5,306,042 A | * | 4/1994 | Frank | 280/728.3 |
| 5,308,111 A | * | 5/1994 | Sommer | 280/728.2 |
| 5,360,231 A | * | 11/1994 | Adams | 280/728.2 |
| 5,385,366 A | * | 1/1995 | Frank et al. | 280/728.3 |
| 5,443,285 A | * | 8/1995 | Boll | 280/732 |
| 5,460,401 A | * | 10/1995 | Gans et al. | 280/728.3 |
| 5,474,324 A | * | 12/1995 | Bentley et al. | 280/728.3 |
| 5,533,746 A | * | 7/1996 | Whited | 280/728.2 |
| 5,613,701 A | * | 3/1997 | Bentley et al. | 280/728.3 |
| 5,651,562 A | * | 7/1997 | Hagen et al. | 280/728.3 |
| 5,653,461 A | * | 8/1997 | Fischer | 280/728.3 |
| 5,899,488 A | * | 5/1999 | Muller | 280/728.3 |

(Continued)

FOREIGN PATENT DOCUMENTS

| | | |
|---|---|---|
| EP | 1 231 133 A2 | 8/2002 |
| EP | 1 249 386 A1 | 10/2002 |

(Continued)

*Primary Examiner* — Nicole Verley
(74) *Attorney, Agent, or Firm* — Birch, Stewart, Kolasch & Birch, LLP (57) ABSTRACT

An airbag device for straddle type vehicles is provided with: an airbag module in which a holding box that stores an airbag functions as a case; and an airbag control unit that controls said airbag module. The airbag module is provided with the holding box that is disposed immediately in front of a rider's seat, a lid that closes the opening of the holding box, and a hinge that functions as a rotary fulcrum for the lid when the airbag inflates, and that is positioned on the rear side, with respect to the vehicle, of the lid. A linking mechanism for restricting the opening angle of the lid is provided between the lid and the holding box.

10 Claims, 11 Drawing Sheets

(56) References Cited

U.S. PATENT DOCUMENTS

| | | | |
|---|---|---|---|
| 5,938,231 A * | 8/1999 | Yamazaki | 280/730.1 |
| 5,941,558 A * | 8/1999 | Labrie et al. | 280/728.3 |
| 5,947,512 A * | 9/1999 | Magoteaux et al. | 280/731 |
| 5,967,545 A | 10/1999 | Iijima et al. | |
| 6,024,377 A * | 2/2000 | Lane, Jr. | 280/728.3 |
| 6,045,154 A * | 4/2000 | Walton et al. | 280/728.3 |
| 6,053,527 A * | 4/2000 | Gans et al. | 280/728.3 |
| 6,082,760 A * | 7/2000 | Ukai et al. | 280/728.3 |
| 6,099,028 A * | 8/2000 | Seifert | 280/728.3 |
| 6,113,133 A * | 9/2000 | Iijima et al. | 280/730.1 |
| 6,131,945 A * | 10/2000 | Labrie et al. | 280/728.3 |
| 6,203,056 B1 * | 3/2001 | Labrie et al. | 280/728.3 |
| 6,443,483 B2 * | 9/2002 | Ellerbrok | 280/728.3 |
| 6,457,738 B1 * | 10/2002 | Labrie et al. | 280/728.3 |
| 6,733,033 B2 * | 5/2004 | Muller | 280/728.3 |
| 6,742,804 B2 * | 6/2004 | Suzuki et al. | 280/728.3 |
| 6,848,709 B2 * | 2/2005 | Nagatsuyu | 280/730.1 |
| 6,932,379 B2 * | 8/2005 | Yamazaki et al. | 280/730.1 |
| 6,938,917 B2 * | 9/2005 | Jahn | 280/728.3 |
| 6,955,376 B1 * | 10/2005 | Labrie et al. | 280/728.3 |
| 7,029,027 B2 * | 4/2006 | Gray et al. | 280/728.3 |
| 7,165,780 B2 * | 1/2007 | Segura | 280/728.3 |
| 7,201,394 B2 * | 4/2007 | Mori et al. | 280/728.3 |
| 7,210,700 B2 * | 5/2007 | Zagrodnick | 280/728.3 |
| 7,255,363 B2 * | 8/2007 | Horiuchi | 280/728.3 |
| 7,380,821 B2 * | 6/2008 | Higuchi | 280/743.1 |
| 7,497,464 B2 * | 3/2009 | Horiuchi et al. | 280/730.1 |
| 7,578,516 B2 * | 8/2009 | Horiuchi et al. | 280/728.3 |
| 7,789,416 B2 * | 9/2010 | Horiuchi et al. | 280/728.3 |
| 2003/0085555 A1 * | 5/2003 | Segura | 280/728.3 |
| 2003/0193173 A1 * | 10/2003 | Mori et al. | 280/728.3 |
| 2003/0222438 A1 | 12/2003 | Nagatsuyu | |
| 2007/0170704 A1 * | 7/2007 | Miyata | 280/730.1 |
| 2008/0079244 A1 * | 4/2008 | Kato et al. | 280/728.3 |
| 2011/0084469 A1 * | 4/2011 | Wittkamp | 280/728.3 |
| 2012/0280476 A1 * | 11/2012 | Ory | 280/728.3 |

FOREIGN PATENT DOCUMENTS

| | | |
|---|---|---|
| EP | 1 354 791 A2 | 10/2003 |
| EP | 1 661 799 A1 | 5/2006 |
| JP | 9-156555 A | 6/1997 |
| JP | 9-328053 A | 12/1997 |
| JP | 2002-284064 A | 10/2002 |
| JP | 2003-261081 A | 9/2003 |
| JP | 3592447 B2 | 11/2004 |
| JP | 3685872 B2 | 8/2005 |
| JP | 2006-151273 A | 6/2006 |

\* cited by examiner

AIRBAG DEVICE FOR STRADDLE TYPE VEHICLES

TECHNICAL FIELD

The present invention relates to improvement in an air bag apparatus for a saddle-ride type vehicle.

BACKGROUND ART

Saddle-ride type vehicles include air bag apparatuses disposed forward of rider's seats to be inflated or deployed when the vehicles are subject to impact, as disclosed in Patent Literatures 1 and 2 below.

An air bag apparatus disclosed in Patent Literature 1 includes an air bag stored in a bag housing disposed forward of a fuel tank located forward of a seat mounted on a frame of a motorcycle. A restrainer extends rearward from a middle part of a rear side of the air bag for restraining the air bag as the air bag is deployed. The restrainer has one end coupled to the frame under the seat.

As the air bag begins to be deployed, a lid disposed on a top of the bag housing pivots upward to an opened portion on a hinge located at a front side of the bag housing. The air bag is further deployed out of the bag housing, when the restrainer stretches to hold the deployed air bag in a desired position.

The restrainer, which holds the air bag in the desired position, is essential for the air bag apparatus of Patent Literature 1. However, the restrainer extends out of the bag housing to the frame of the motorcycle, which provides aesthetically adverse effect on the air bag apparatus. To eliminate such a restrainer, effort has been made to develop an air bag apparatus disclosed in Patent Literature 2 below.

The air bag apparatus disclosed in Patent Literature includes an air bag stored in a bag housing disposed directly forward of a seat mounted on a frame of a motorcycle. A fuel tank is disposed forward of the bag housing.

As the air bag begins to be deployed, a lid disposed at a top of the bag housing pivots upward to an opened position. Finally, the air bag is deployed vertically upward. The air bag apparatus of Patent Literature is featured by not only elimination of the restrainer disclosed in Patent Literature 1 but also the disposition of the bag housing directly forward of the seat to shorten a distance between the bag housing and a rider.

It is desirable that an air bag be deployed between a rider and a vehicle front side including a handle etc. in such a manner as to support the rider after the deployed air bag comes into contact with the vehicle front side. However, the air bag of the air bag apparatus, which is deployed vertically upward, supports the rider before making contact with the vehicle front side. This implies that a direction of deployment of the air bag is important in supporting the rider. There is need for improvement in the air bag apparatus to control a direction of deployment of the air bag.

PRIOR ART LITERATURE

Patent Literature

Patent Literature 1: Japanese Patent No. 3,592,447
Patent Literature 2: Japanese Patent No. 3,685,872

SUMMARY OF INVENTION

Technical Problem

An object of the present invention to provide a saddle-ride air bag apparatus configured to allow an air bag to be deployment in a desired direction.

Solution to Problem

According to one aspect of the present invention, there is provided An air bag apparatus for a saddle-ride type vehicle, comprising: a retaining box disposed on a vehicle body of the vehicle and located directly forward of a rider's seat; an air bag stored in the retaining box and configured to be deployed forward of a rider; a lid for closing an opening portion of the retaining box, the lid having a hinge portion formed on a rear side thereof for allowing the lid to pivot on the hinge portion during deployment of the air bag; and lid restricting means disposed between the lid and the retaining box for restricting an angle through which the lid pivots on the hinge portion away from the opening portion of the retaining box.

Preferably, the apparatus further comprises left and right lid stays integral with the lid, the lid restricting means being provided at each of the lid stays.

Preferably, the lid restricting means comprises a link mechanism.

Preferably, the lid restricting means comprises a strip.

Preferably, the lid stays are insert-molded into the lid.

Preferably the lid restricting means restricts the angle to less than 90 degrees relative to a road surface with the air bag apparatus carried on the vehicle.

Preferably, the strip includes a fragile portion formed longitudinally thereof, and the apparatus further comprises a fastener holding one end of the fragile portion to the retaining box. The lid is pivotable away from the opening portion through a predetermined angle while allowing the fastener to break the fragile portion.

Preferably, the strip extends inside the lid and between left and right sides of the lid, the apparatus further comprising a guide member disposed inside the lid and retaining the strip, the lid being pivotable away from the opening portion through a predetermined angle while allowing the strip to travel between the lid and the guide member.

Advantageous Effects of Invention

The air bag apparatus includes lid restricting means disposed between the lid and the retaining box for restricting the angle through which the lid pivots away from the retaining box. The lid restricting means restricts a direction of the air bag deployment, which causes the pivotal movement of the lid away from the retaining box. The lid restricting means allows for the deployment of the air bag in a desired direction.

The left and right lid stays provided at the lid allow for even dispersion of impact throughout the lid during the pivotal movement of the lid. The lid, which is provided with these lid stays, is easy to design.

The lid restricting means comprises the link mechanism having links configured to be aligned with each other during the pivotal movement of the lid. The aligned links restrains the air bag from expanding outward of the links, guiding the air bag in such a manner as to be deployed toward a desired region.

The lid restricting means comprises the strip. Use of the strip helps reduce the components of the air bag apparatus unlike use of a multi-piece mechanism. The reduction in the number of the components of the apparatus reduces cost of the apparatus.

The lid and the lid stay are integrated together by insert molding without use of any fasteners. This leads to reduction in the number of components of the air bag apparatus.

The angle through which the lid pivots away from the retaining box is set to be less than 90 degrees for allowing the air bag to be deployed spreading out from a front side of the retaining box to a region above the retaining box even if a rider is forced to shift forward.

The lid pivots away from the retaining box through a predetermined angle allowing the fastener on the retaining box to break the strip along the fragile portion of the strip. The breaking of the strip along the fragile portion helps slow down the pivotal movement of the lid during the deployment of the air bag.

The strip, which extends inside the lid between the left and right sides of the lid, is retained by the guide members. The guide members restrict movement of the strip to allow the lid to pivot away from the retaining box through a predetermined angle. The restricted movement of the strip slows down the pivotal movement of the lid.

MODE FOR CARRYING OUT THE INVENTION

Certain preferred embodiments of the present invention are described below with reference to the accompanying drawings.

Embodiment 1

Figure 1:
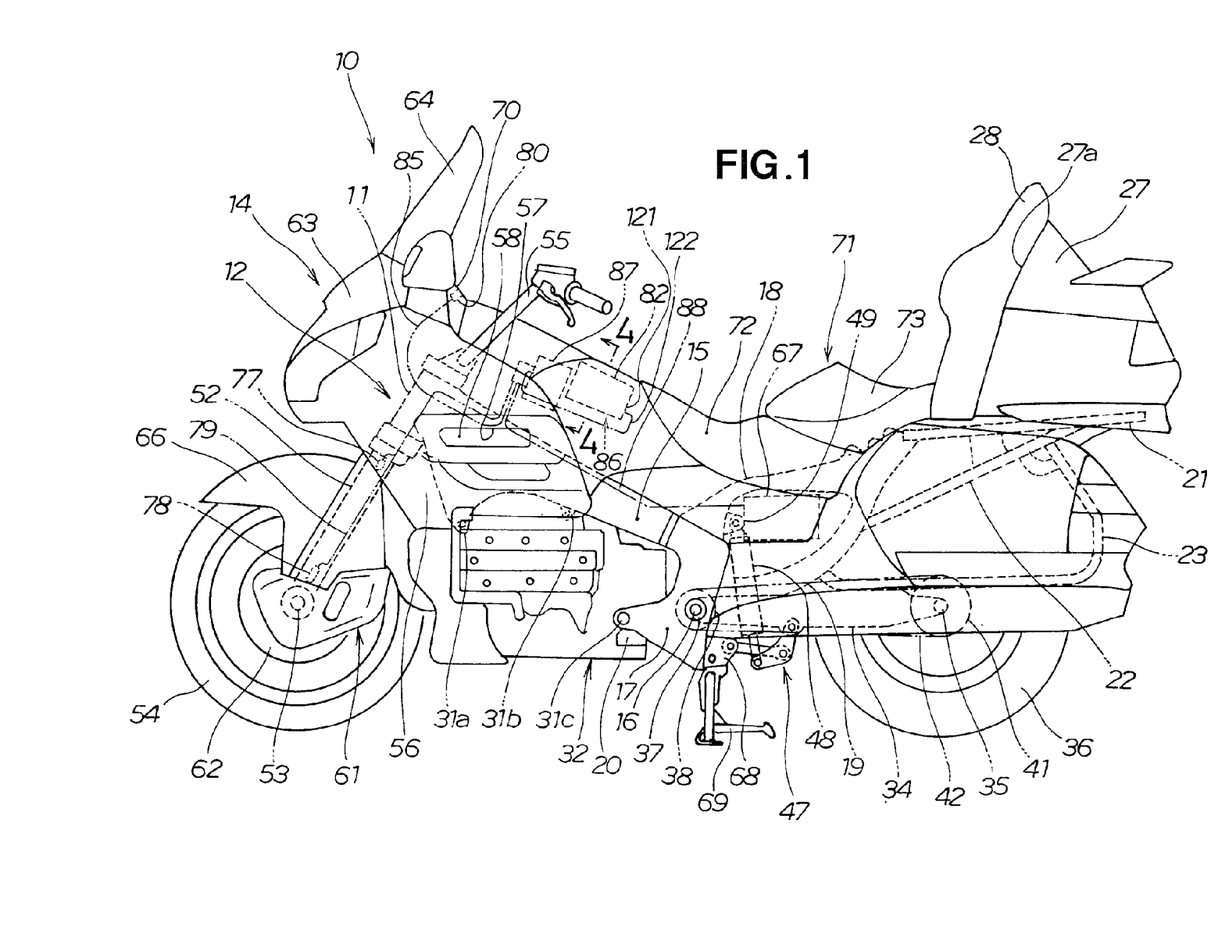
FIG. 1 is a left side elevational view of a motorcycle including an air bag apparatus according to Embodiment 1 of the present invention.

Referring to FIG. 1, a motorcycle 10, which is a saddle-ride type vehicle, includes a headpipe 11. A vehicle body frame 12 extends rearward.

The vehicle body frame 12 includes the headpipe 11 forming a front part of a vehicle body 14, a main frame 15 extending rearward from the headpipe 11, and a pivot plate 17 attached to a rear end of the main frame 15 and carrying a pivot shaft 16. The vehicle body frame 12 further includes a seat rail 18 extending upward and rearward from a top of the pivot plate 17, and a middle frame 19 interconnecting a rear end of the seat rail 18 and a middle of the pivot plate 17 and supporting the seat rail 18. The seat rail 18 forms a rear part of the vehicle body frame 12. Attached to a bottom of the pivot plate 17 is a footrest 20 for a rider's foot to rest on.

A sub-rail 21 extends rearward from an upper end of the middle frame 19. The sub-rail 21 has its rear part connected to the middle frame 19 through a seat stay 22. An auxiliary stay 23 extends downward and rearward from a rear part of the seat stay 22, and then runs horizontally. Mounted on the sub-rail 21 is a trunk 27 for storing articles. The trunk 27 has its front wall 27a to which is attached a backrest 28 for supporting a back of a rider.

It will be understood that respective ones of the main frame 15, the pivot frame 17, the seat rail 18, the middle frame 19, the step 20, the sub-rail 21, the seat stay 22 and the auxiliary stay 23 are symmetrically provided on opposite sides of the motorcycle 10.

An engine 32 is fixed below the main frame 15 with fasteners 31a to 31c. The engine 32 is, for example, a flat-six, water-cooled engine.

Mounted to the pivot plate 17 is a rear swing arm 34 pivotable vertically on the pivot shaft 16. The rear swing arm 34 has its rear end to which is attached a rear axle 35. A rear wheel 36 is rotationally attached to the rear axle 35. Mounted to the rear wheel 36 is a driven sprocket 41. The engine 32 has a drive shaft 37 to which is attached a drive sprocket 38. The rear wheel 36 is driven by a chain 42 extending around the sprockets 38, 41.

The rear swing arm 34 carries a link mechanism 47 to which is attached a lower end of a rear cushion unit 48. The rear cushion unit 48 has its upper end attached to a bracket 49 disposed near the main frame 15.

Attached to the headpipe 11 is a steerable front folk 52. The front folk 52 carries a front axle 53. A front wheel 54 is rotationally attached to the front axle 53. The front folk 53 has its upper end to which is mounted a steering handle 55 supported by the headpipe 11.

Provided on a side of a front part of the main frame 15 is a main cowl 56 having an opening 57 formed at a side thereof. A radiator unit 58 for cooling the engine 32 is positioned facing the opening 57.

Disposed above the front wheel 54 is a front fender 66. A front disc plate 62 is integral with the front wheel 54. The front folk 52 carries a front disc brake unit 61 for sandwiching the front disc plate 62.

Located forward of the headpipe 11 is a front cowl 63 covering a front part of the motorcycle 10. A front shield 64 extends from a top of the front cowl 63. Provided at a lower end of the pivot plate 17 is a main stand bracket 68. A main stand 69 is attached to the main stand bracket 68. A battery 67 is disposed below a rider's seat 71 for a rider to sit on. A meter 70 is disposed rearward of the front shield 64.

The seat 71 is disposed on the seat rail 18. The seat 71 includes a front seat portion 72 and a rear seat portion 73 disposed rearward of and contiguous with the front seat portion 72.

An air bag apparatus 86 includes an air bag module 82 and an air bag control unit 87 for controlling deployment of an air bag 150 (FIG. 4) stored in the air bag module 82.

The air bag module 82 is disposed proximate the seat 71. The air bag module 82 includes a retaining box 121, which is a case. The retaining box 121 is disposed directly forward of the seat 71.

Disposed at top and bottom portions of the front folk 52 are first and second sensors 77, 78 for detecting impact on the vehicle body 14. A first cable 79 extends from the top and bottom sensors 77, 78. The first cable 79 runs over the engine 32 and is connected to the air bag control unit 87. The meter 70 includes an indicator 80 for indicating whether the air bag apparatus 86 is in a normal or abnormal state. A second cable 85 extends from the indicator 80. The second cable 85 is connected to the air bag control unit 87. A third cable 88 extends from the battery 67. The third cable 88 extends below the seat 71 and is connected to the air bag control unit 87. It will be noted that each of the first sensor, the second sensor 78, and the first cable 79 is provided in pairs on left and right folk parts of the front folk 52.

Figure 2:
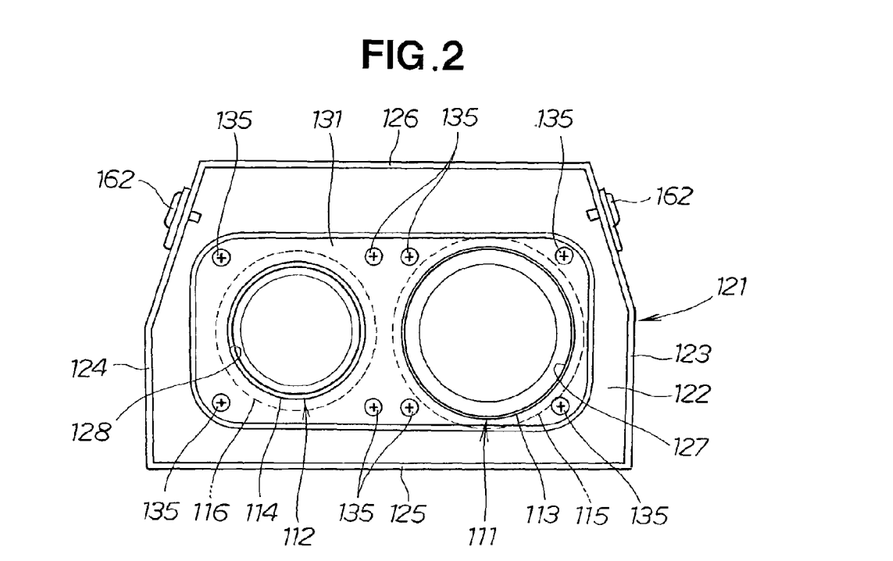
FIG. 2 is a top plan view of an air bag module with a lid and an air bag removed.
Figure 3:
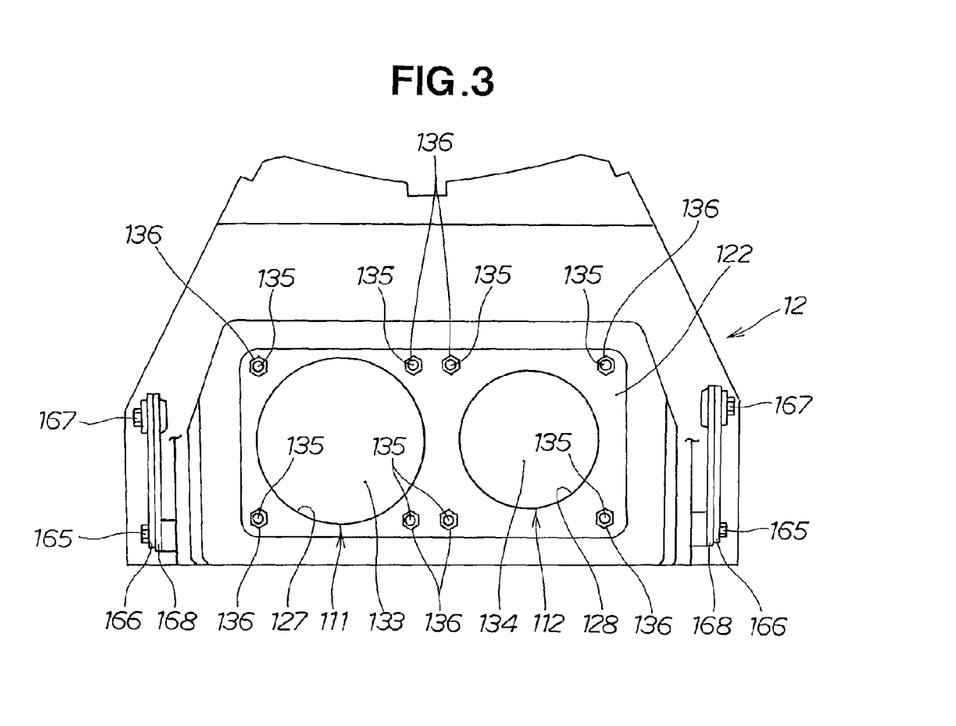
FIG. 3 is a bottom view of the air bag module shown in FIG. 2

The air bag module 82 storing an inflator and the air bag will be discussed below with reference to FIGS. 2 and 3. FIG. 2 shows in top plan the air bag module 82 with a lid and the air bag removed. FIG. 3 shows in bottom plan the air bag module 82.

Turning to FIG. 2, the inflator is provided in pairs. That is, a left inflator 111 is disposed on a left side of the motorcycle 10 while a right inflator 112 is disposed on a right side of the motorcycle 10. The left inflator 111 produces gas whose amount is different from that produced by the right inflator 112. The left inflator 111 is greater in size than the right inflator 112 in order that the left inflator 111 provides more gas than the right inflator 112 does. The left inflator 111 includes an outer wall 113 having a mount flange 115 projecting outward from the outer wall 113. The right inflator 112 includes an outer wall 114 having a mount flange 116 projecting outward from the outer wall 114.

The retaining box 121 includes a bottom plate 122, left and right walls 123, 124 extending upward from the bottom plate 122, and front and rear walls 125, 126 extending upward from the bottom plate 122. The bottom plate 122 has left and right openings 127, 128 sized to allow lower parts 133, 134 of the inflators 111, 112 to pass through the openings 127, 128, respectively. The left and right inflators 111, 112 are fitted in the openings 127, 128 of the bottom plate 122 with an air bag ring 131 clamping the mount flanges 115, 116 to the bottom plate 122.

Turning to FIG. 3, the lower part 133 of the left inflator is fitted in the left opening 127 of the bottom plate 122. The lower part 134 of the right inflator is fitted in the right opening 128 of the bottom plate 122.

Nuts 136 are tightened onto eight screws 135 to attach the left and right inflators 111, 112 to the retaining box 121 with the mount flanges 115, 116 (FIG. 2) firmly sandwiched between the bottom plate 122 and the air bag ring 131 (FIG. 2).

Figure 4:
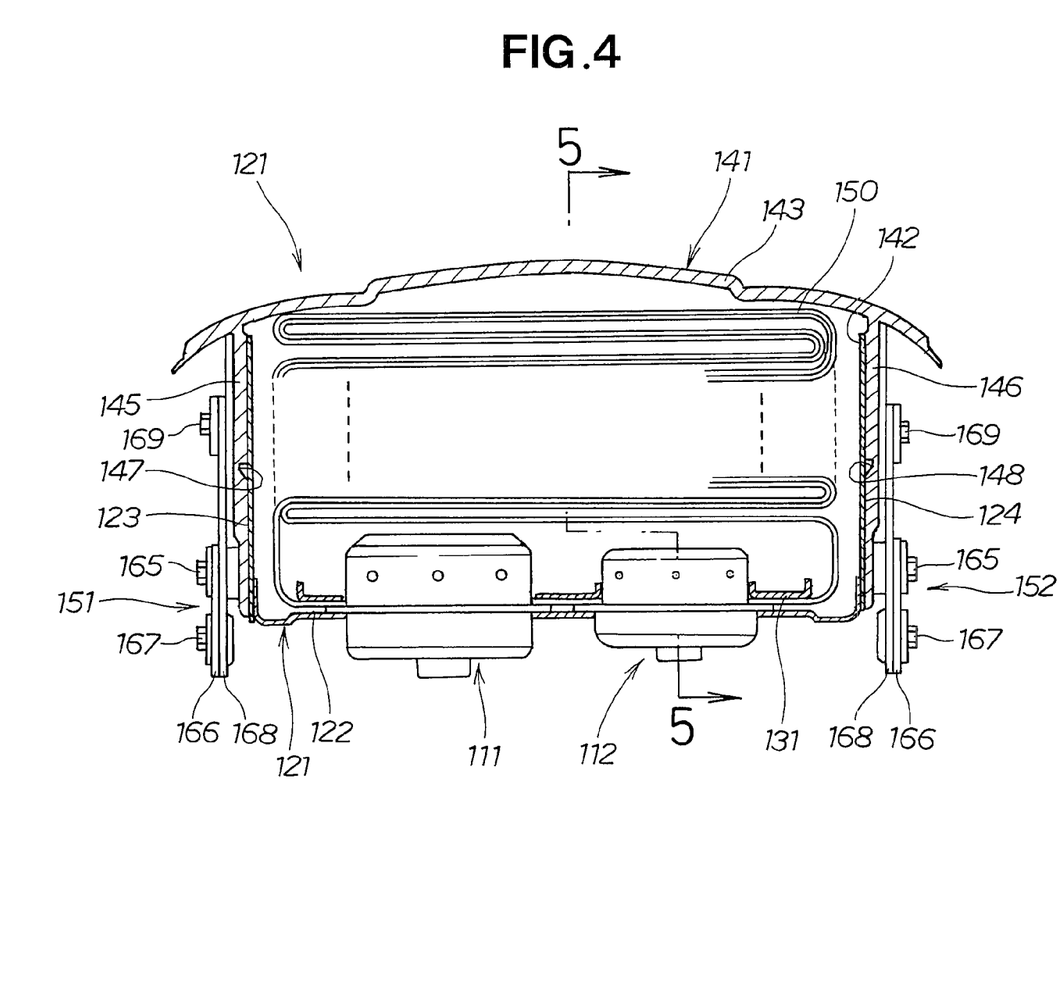
FIG. 4 is an enlarged cross-sectional view taken along line 4-4 of FIG. 1.

Reference is made to FIG. 4. A lid 141 is arranged to close an upwardly opening portion 142 of the retaining portion 121. The lid 141 includes a cover portion 143 for covering the opening portion 142. The lid 141 further includes a left vertical wall 145 extending downward from a vicinity of a left end of the cover portion 143, and a right vertical wall 146 extending downward from a vicinity of a right end of the cover portion 143. The left vertical wall 145 is attached to the left wall 123 of the retaining box 121 and the right vertical wall 124 is attached to the right wall 124 of the retaining box 121.

The left vertical wall 145 has a fragile portion 147 having a half height of the overall height of the wall 145 for allowing the left vertical wall 145 to cut along the fragile portion 147 during deployment of the air bag 150. The right vertical wall 146 has a fragile portion 148 having a half height of the overall height of the wall 146 for allowing the right vertical wall 146 to cut along the fragile portion 148 during deployment of the air bag 150. The deployment of the air bag 150 cuts the lid 141 along the fragile portions 147, 148 to cut an upper side of the lid 141 away from the retaining box 121.

A left link mechanism 151 is disposed outside the left vertical wall 145 for restricting an angle through which the lid 141 pivots away from the opening portion 142 during deployment of the air bag 150. A right link mechanism 152 is disposed outside the right vertical wall 146 for restricting an angle through which the lid 141 pivots away from the opening portion 142 during deployment of the air bag 150.

Figure 5:
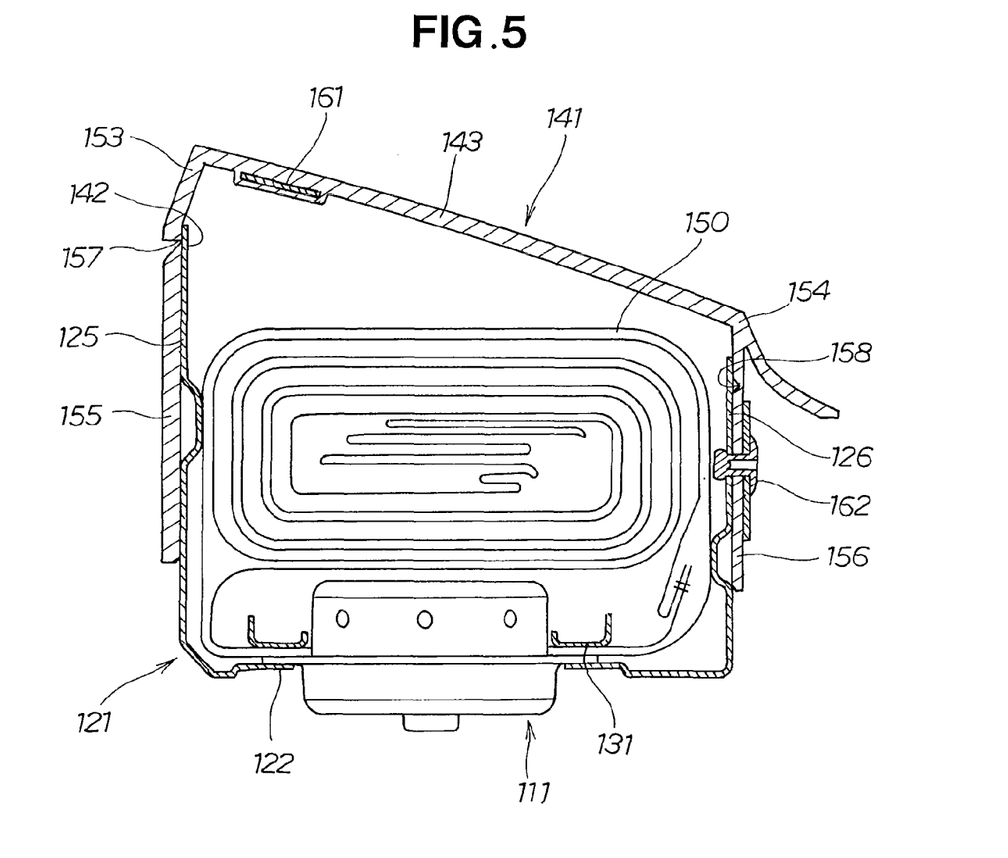
FIG. 5 is a cross-sectional view taken along line 5-5 of FIG. 4.

As shown in FIG. 5, the lid 141 includes a front vertical wall 155 extending downward from a front end 153 of the cover portion 143, and a rear vertical wall 156 extending downward from a rear end 154 of the cover portion 143. The front vertical wall 155 is attached to the front wall 125 of the retaining box 121. The rear vertical wall 156 is attached to the rear wall 126 of the retaining box 121.

The front vertical wall 155 has a front fragile portion 157 having a half height of the overall height of the wall 155 for allowing the front vertical wall 155 to cut along the front fragile portion 157 when the air bag 150 is deployed to cause the lid 141 to pivot away from the opening portion 142. The rear vertical wall 156 has a hinge portion 158 having a half height of the overall height of the wall 156. The deployment of the air bag 150 causes the lid 141 to pivot on the hinge portion 158 away from the opening portion 142. The hinge portion 158 is formed at a rear side of the lid 141.

A lid stay 161 extends transversely of the cover portion 143 of the lid 141. The lid stay 161 is insert-molded into the cover portion 143 of the lid 141. The lid stay 161 is made of metal. The lid 141 is made of resin. The lid 141 is affixed to a rear side of the retaining box 121 by plural rivets 162.

Figure 6:
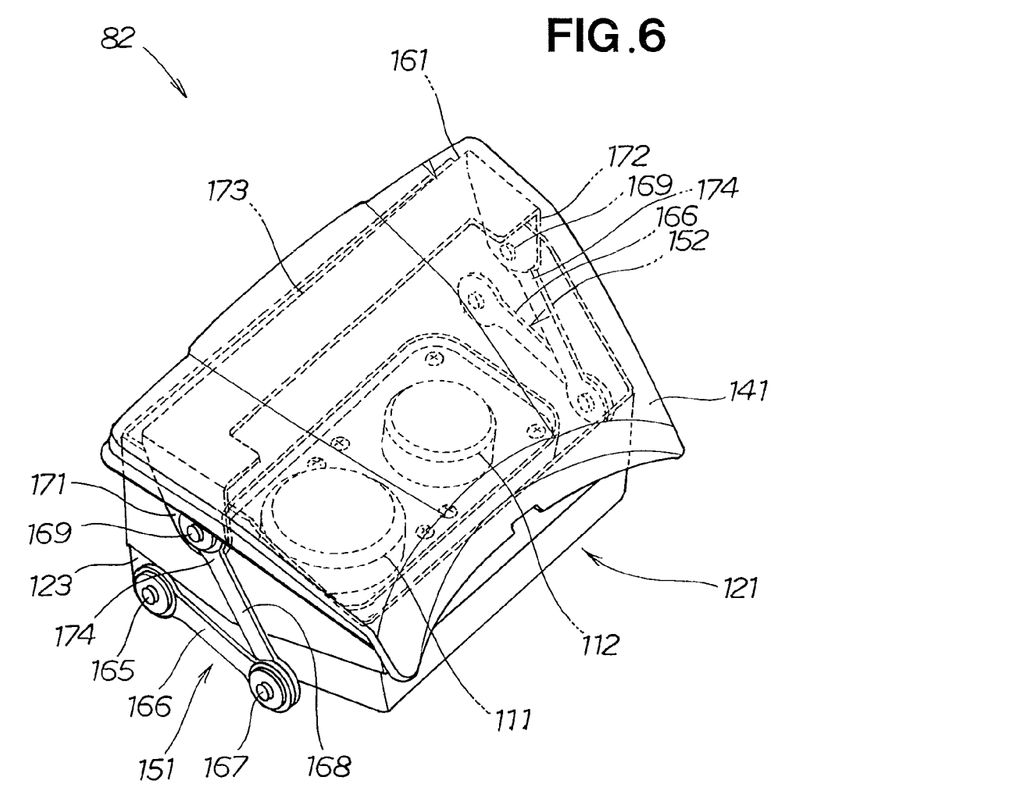
FIG. 6 is a perspective view of the air bag module shown in FIG. 2.

Referring to FIG. 6, the left link mechanism 151 includes a first pivot 165 attached to the left wall 123 of the retaining box 121, a first link 166 extending rearward from the first pivot 165, a second pivot 167 provided at a distal end portion of the first link 166, a second link 168 extending upward and forward from the second pivot 167, and a third pivot 169 provided at a distal end portion 174 of the second link 168 and attached to the lid stay 161. It is to be understood that the right link mechanism 152 has the same structure as that of the left link mechanism 151, and hence discussion of the right link mechanism 152 will be omitted.

The lid stay 161 includes a horizontal arm 173, a left vertical arm 171 extending downward from a left end of the horizontal arm 173, and a right vertical arm 172 extending downward from a right end of the horizontal arm 173. To the left and right vertical arms 171, 172 are attached the respective third pivots 169, 169. The distal end portions 174, 174 of the second link 168 are attached to the third pivots 169, 169 in such a manner as to allow pivotal movement of the second link 168.

The air bag module 82 includes the retaining box 121 and the air bag 150 (FIG. 4) stored in the retaining box 121. When inflated, the air bag 150 is deployed forward of a rider sitting on the seat 71. The air bag module 82 includes the lid 141 closing the opening portion 142 (FIG. 4) of the retaining box 121. The lid 141 has the hinge portion 158 (FIG. 5) formed on the rear side thereof for allowing the lid 141 to pivot on the hinge portion 158 away from the opening portion 142 during deployment of the air bag 150. The air bag module 82 further includes the left and right link mechanisms 151, 152 disposed between the lid 141 and the retaining box 121. The link mechanisms 151, 152 provide lid restricting means for restricting an angle through which the lid 141 pivots away from the opening portion 142.

The lid stay 161 is integral with the lid 141. The link mechanisms 151, 152 are attached to the left and right vertical arms 171, 172 of the lid stay 161. The horizontal arm 173 is integral with the left and right vertical arms 171, 172. The lid stay 161 has a U-shape and interconnects the left and right link mechanisms 151, 152. The left and right vertical arms 171, 172, which are connected to each other via the horizontal arm 173, allow for even dispersion of impact from the link mechanisms 151, 152 throughout the lid 141 when the lid 141 pivots away from the opening portion 142.

Description will be made as to functions of the foregoing air bag apparatus in Embodiment 1.

Turning to FIG. 7(a), the retaining box 121 is closed by the lid 141. The link mechanism 151 is disposed between the lid 141 and the retaining box 121.

Referring to FIG. 7(b), as the air bag 150 is deployed, the lid 141 pivots away from the opening portion of the retaining box 121 to bring the first link 166 and the second link 168 into alignment.

Figure 7:
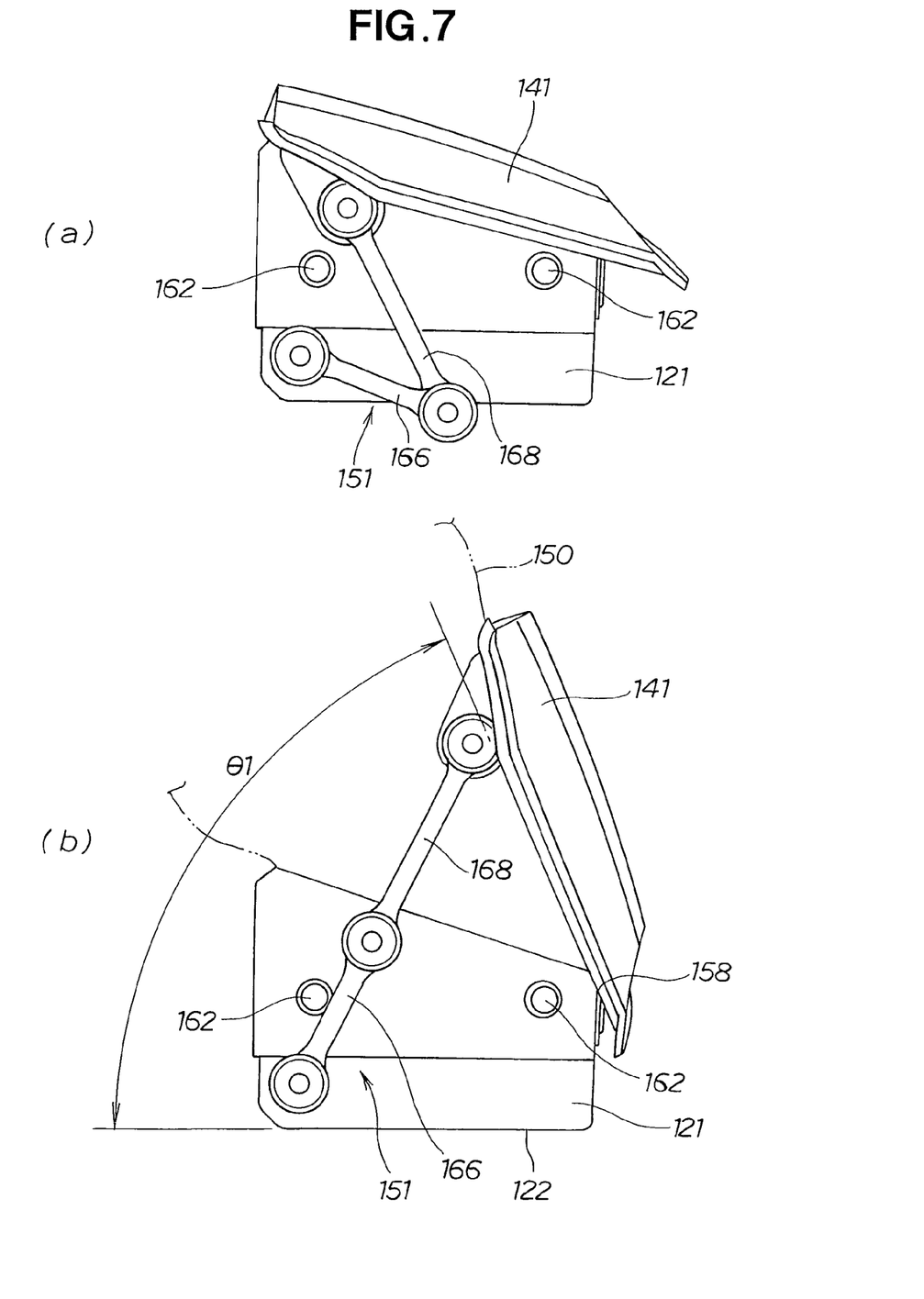
FIG. 7 is a view illustrating function of lid restricting means of the air bag module shown in FIG. 6.

If no link mechanism for limiting an angle through which the lid 141 pivots away from the opening portion of the retaining box 121 were disposed between the retaining box 121 and the lid 141, it would be difficult to control the air bag 150 to be deployed forward and upward.

The present invention provides the link mechanisms 151, 152 between the retaining box 121 and the lid 141, as discussed above. The link mechanisms 151, 152 are arranged to control the lid 141 to pivot away from the opening portion of the retaining box through a limited angle θ1, such that, when inflated, the air bag 150 is deployed upward to a limited extent but forward of a rider freely. The air bag, which is deployed upward to a limited extent but forward freely, can be in a desired position. More specifically, the air bag 150 can be deployed in a direction suitable for a rider who has been forced to shift forward when undergoing impact.

The angle θ1 is defined as an angle through which the lid 141 pivots on the hinge portion 158 relative to the bottom plate 122 of the retaining box 121. The angle θ1 is set to be 70 degrees in Embodiment 1. It will be understood that the angle θ1 is not limited to 70 degrees but may be changed.

During the pivotal movement of the lid 141 away from the opening portion 142 of the retaining box 121, the first link 166 comes into alignment with the second link 168. The first and second links 166, 168, which are aligned with each other, hinder the air bag 150 from being deployed outward of the links 166, 168, guiding the air bag 150 to allow the air bag 150 to be deployed toward a desired region.

The lid stay 161, which is highly likely to undergo a force, is made from metal. The lid 141 for closing the retaining box 121 is made of resin. Provision of the metal lid stay 161 and the resin lid 141 results in lightweight air bag module 82 having required strength. In addition, it is easy to form the fragile portions 147, 148, 157 (FIGS. 4 and 5) on the lid 141 because the lid 141 is made of resin.

Figure 8:
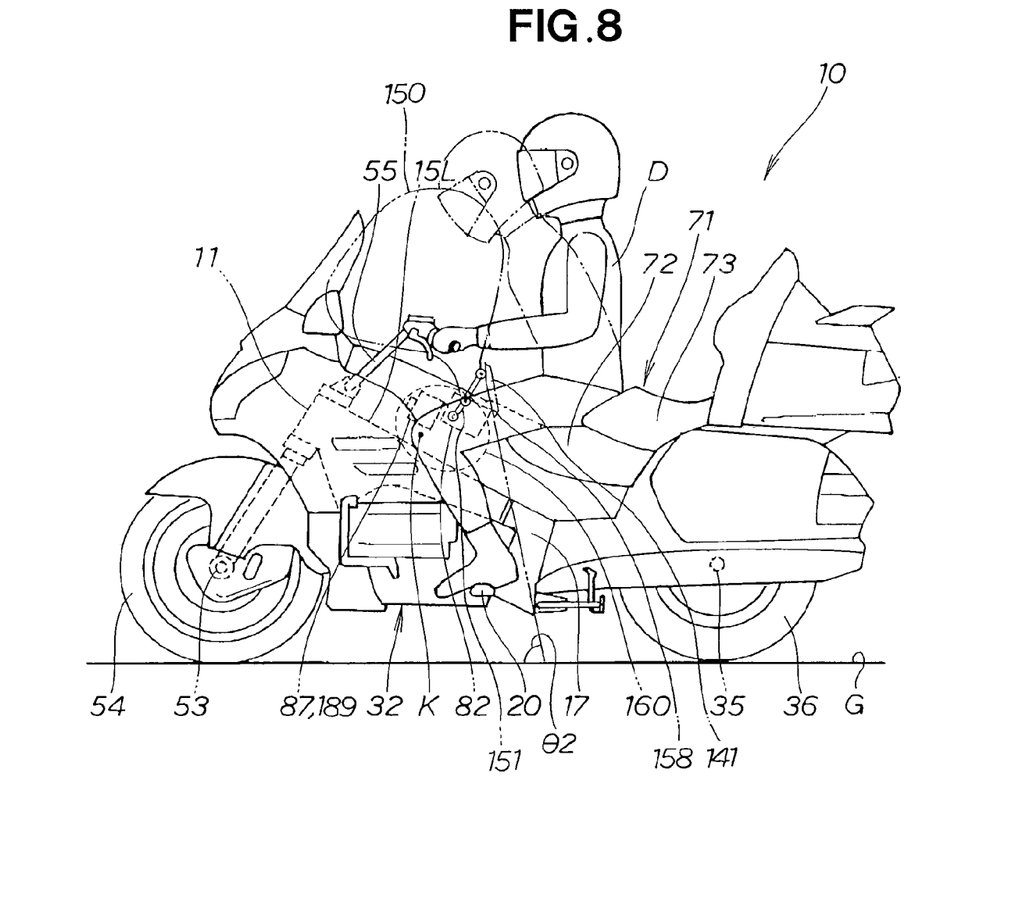
FIG. 8 is a view illustrating function of the air bag apparatus according to Embodiment 1 of the present invention.

Reference is made to FIG. 8. The air bag module 82 is shown carried on the motorcycle 10. The air bag module 82 is designed such that the lid 141 can pivot through an angle θ2 not exceeding 90 degrees relative to a road surface G. A direction of deployment of the air bag 150 when a rider D sits on the seat 71 is determined depending upon values of the angles θ1, θ2.

If the angle θ2 is set to be more than 90 degrees, the air bag may be deployed rearward.

In Embodiment 1, the angle θ2 is set not to exceed 90 degrees relative to the road surface G. This makes it possible for the air bag 150 to be deployed toward a region extending from a forward region located forward of the retaining box to an upward region located above the retaining box. That is, the air bag 150 is deployed forward and upward as the rider D is forced to move forward.

When viewed in side elevation, the air bag control unit 87 is located between the headpipe 11 and the air bag module 82. The air bag control unit 87 includes a delay means 189 for igniting the left and right inflators 111, 112 at different points of time.

The left inflator 111 generates a different amount of gas than that of the right inflator 112. Use of these inflators 111, 112 in combination accommodates different types of air bag apparatuses providing amounts of gas suitable for a variety of saddle-ride type vehicles.

Generally, air bags used in saddle-ride type is greater in capacity than those used in four-wheeled vehicles. Conventionally, it is therefore necessary to use inflators providing large outputs so as to inflate the air bags of the saddle-type vehicles. Such inflators of large outputs require large space.

In Embodiment 1, the left and right inflators 111, 112 provide different amounts of gas. The inflators 111, 112 require smaller space as well as providing outputs necessary to inflate the air bag 150.

Embodiment 2

An air bag apparatus in Embodiment 2 will be described below with reference to FIG. 9(a) and FIG. 9(b).

Figure 9:
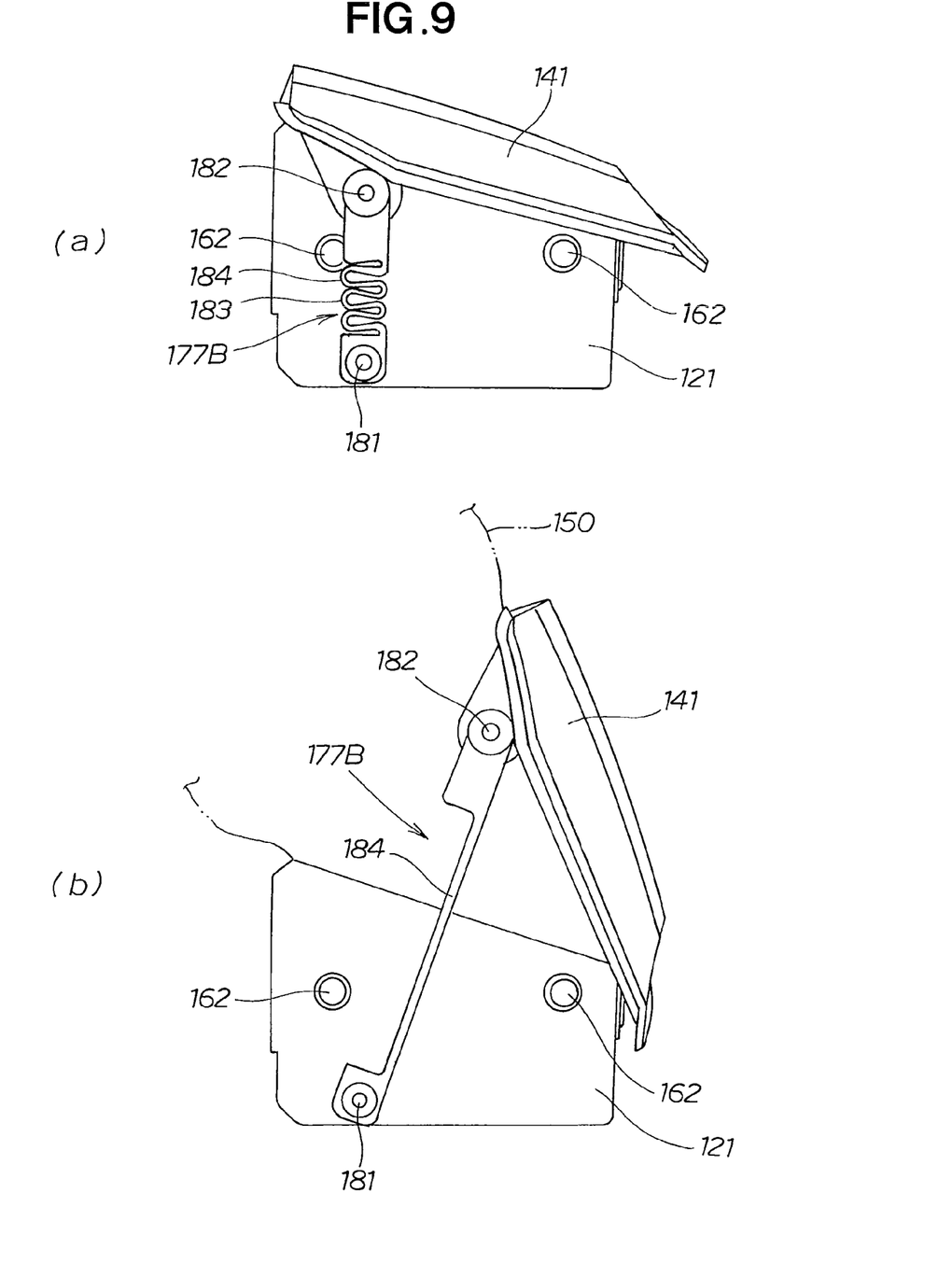
FIG. 9 is a view illustrating structure and function of lid restricting means of an air bag module according to Embodiment 2 of the present invention.

As shown in FIG. 9(a), the retaining box 121 is closed by the lid 141. Between the lid 141 and the retaining box 121 is disposed a strip 177B (webbing) providing lid restricting means for restricting an angle through which the lid 141 pivots away from the retaining box 121. The strip 177B is attached to the retaining box 121 by a fastener 181 and to the lid stay (shown at 161 in FIG. 5) by another fastener 182. The strip 177B has a collapsible portion 184 at an intermediate part 183 thereof. The collapsible portion 184 is folded up and has its length set to allow the lid 141 to pivot through a predetermined angle. The fasteners 181, 182 and the strip 177B are each provided in pairs. The respective pairs of the fasteners 181 and the strips 177B are located on left and right sides of the retaining box 121. The pair of the fasteners 182 is located on left and right sides of the lid stay.

Reference is made to FIG. 9(b). Deployment of the air bag 150 causes the lid 141 to pivot away from the retaining box 121. The pivotal movement of the lid 141 brings the collapsible portion 184 to an unfolded position in which the collapsible portion 184 is straightened out. The strip 177B helps reduce the number of components of the air bag apparatus, unlike, for example, a multi-piece mechanism. The reduction in the number of components of the air bag apparatus results in reduction in the cost for the apparatus. The strip 177B has its function similar to that of the link mechanism in Embodiment 1.

Embodiment 3

An air bag apparatus in Embodiment 3 will be described below with reference to FIG. 10(a) and FIG. 10(b).

As can be seen from FIG. 10(a), the air bag apparatus in Embodiment 3 significantly differs from the air bag apparatus in Embodiment 2 in that a fastener 181C is disposed on the retaining box 121 at a level higher than the fastener 181 and retains one end of a longitudinally extending fragile portion or slit 186 of a strip 177C. The air bag apparatus in Embodiment 3 is similar to the air bag apparatus in Embodiment 2 in other respects.

Figure 10:
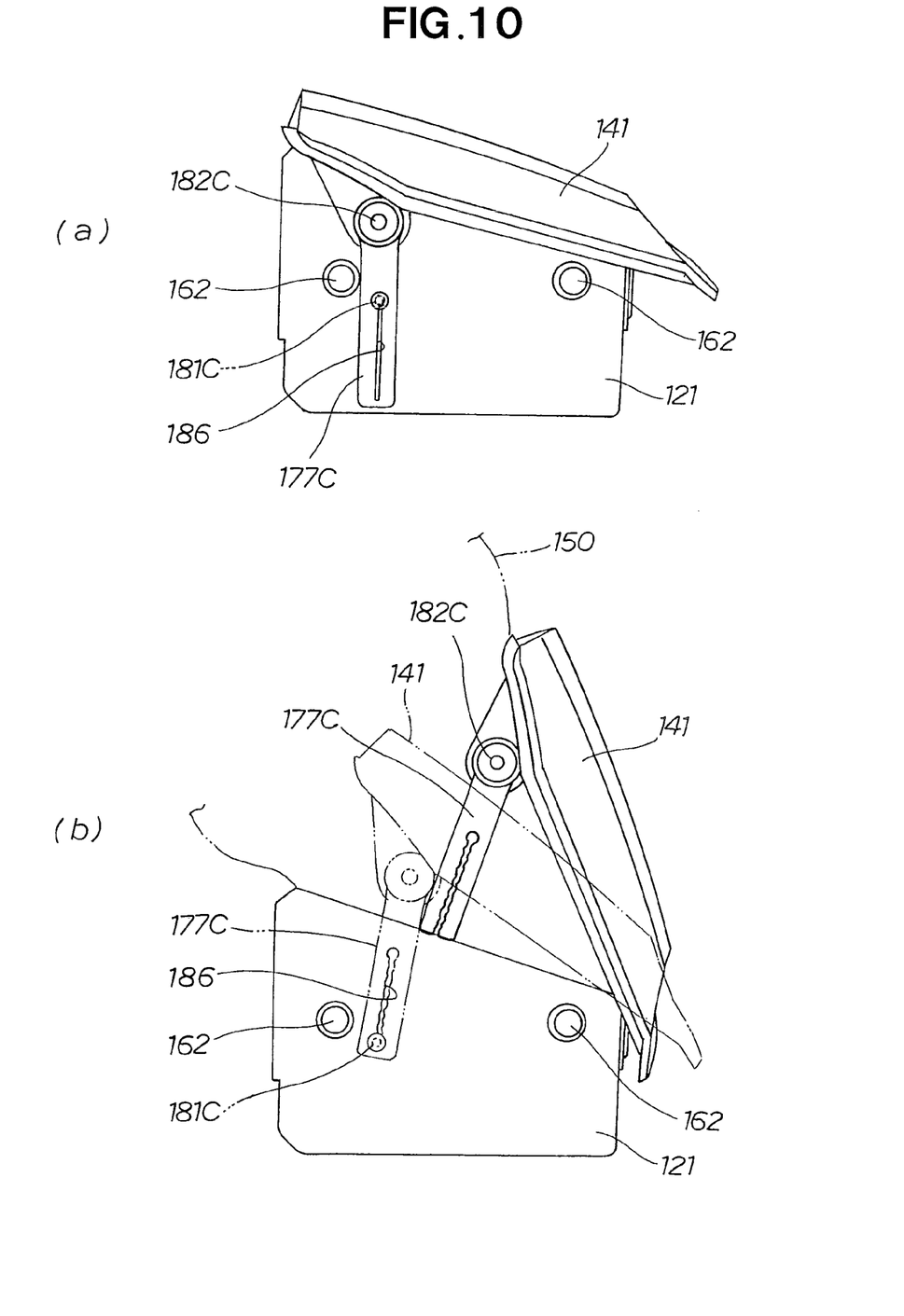
FIG. 10 is a view illustrating structure and function of an air bag module according to Embodiment 3 of the present invention.

Reference is made to FIG. 10(*b*). The lid 141 pivots away from the retaining box 121 through a predetermined angle during deployment of the air bag 150, allowing the fastener 181C to break the strip 177C along the slit 186. Finally, the strip 177C is torn away from the fastener 181C. Namely, the strip 177C, which is broken by and torn away from the fastener 181C, slows down the pivoting lid 141, directing the air bag 150 to be deployed in such a direction as to support a rider.

Embodiment 4

An air bag apparatus in Embodiment 4 will be described below with reference to FIG. 11.

Figure 11:
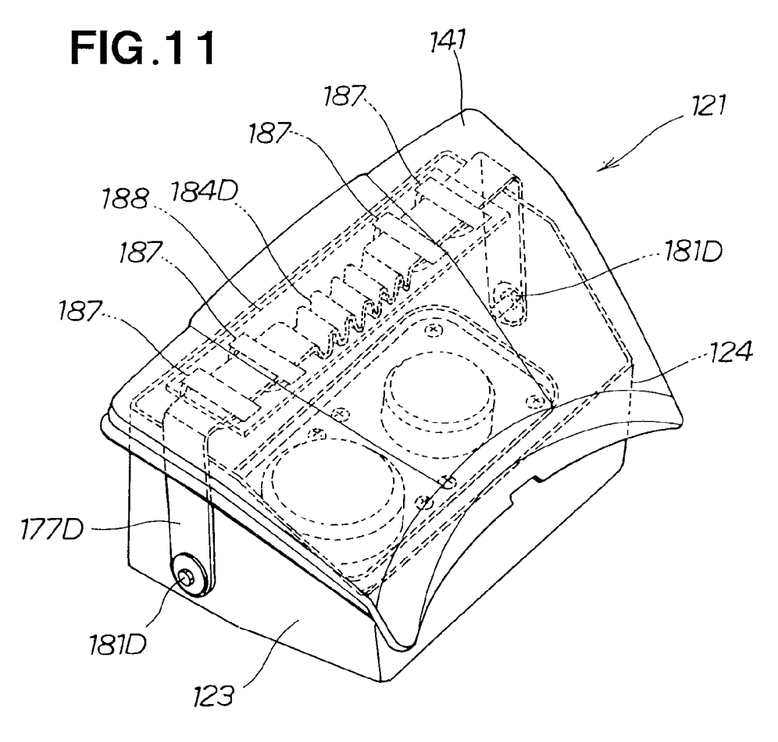
FIG. 11 is a perspective view of an air bag module according to Embodiment 4.

As shown in FIG. 11, a single strip (webbing) 177D, which is lid restricting means for restricting an angle through which the lid 141 pivots away from the retaining box 121, is fastened by fasteners 181D, 181D to the left and right walls 123, 124 of the retaining box 121. A sheet-shaped stay 188 is insert-molded into the lid 141. A plurality of ring-shaped frictional guide members 187 extend from the stay 188. The strip 177D extends through the frictional guide members 187.

The strip 177D has a collapsible portion 184D which is shown folded at a middle of the length thereof. The portion 184D, which is folded, is capable of being unfolded when the lid 141 pivots away from the retaining box 121. The strip 177D is arranged to be guided by the frictional guide members 187 disposed along a back side of the lid 141. The strip 177D restricts the lid 177D from pivoting away from the retaining box 121 through more than a predetermined angle. The strip 177D has its length set in correspondence to a predetermined angle through which the lid 141 pivots away from the retaining box 121. The number of the frictional guide members 187 is four, and these four guide members 187 are attached to the lid 141 for slowing down the strip 177D traveling through the guide members 187 so as to retard pivotal movement of the lid 141 away from the retaining box 121 through a predetermined angle.

The strip 177D helps reduce the number of components of the air bag apparatus, unlike, for example, a multi-piece mechanism. The reduction in the number of components of the air bag apparatus results in reduction in the cost for the apparatus.

Description will be made as to function of the air bag apparatus shown in FIG. 11 in Embodiment 4 with reference to FIG. 12.

Figure 12:
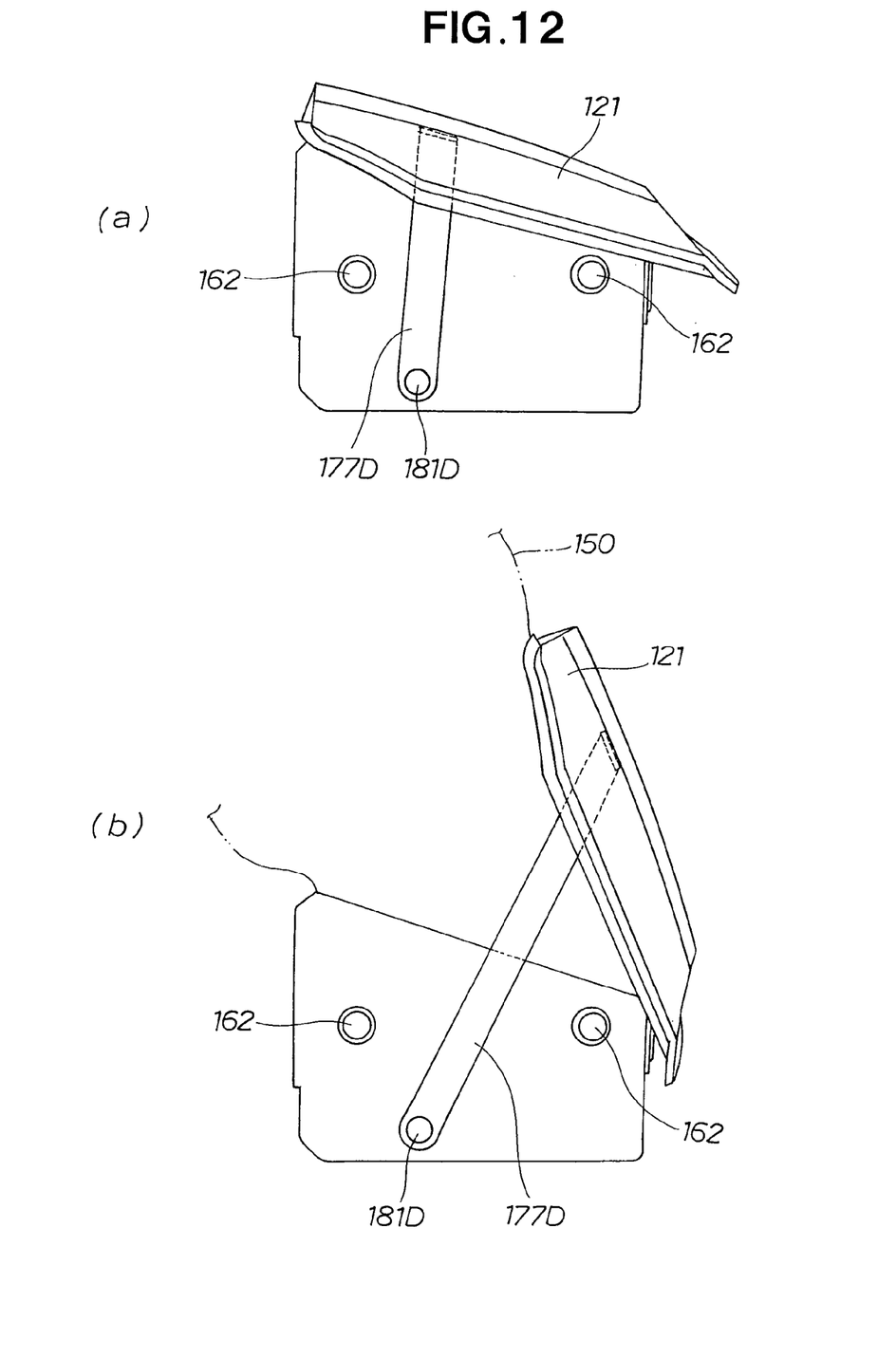
FIG. 12 is a view illustrating function of the air bag module shown in FIG. 11.

As shown in FIG. 12(*a*), the retaining box 121 is closed by the lid 141 with the portion 184D of the strip 177D folded. As the air bag 150 is deployed, the lid 141 begins to pivot away from the retaining box 121 causing the portion 184D of the strip 177D to be unfolded gradually. As the portion 184D is unfolded, the strip 177D slows down by traveling frictionally through the frictional guide members 187, such that a speed of the pivotal movement of the lid 141 is reduced.

Turning to FIG. 12(*b*), the lid 141 is fully pivoted with the strip 177D unfolded after the air bag (not shown) has been deployed. It will be noted that the number of the frictional guide members may be optionally set number such as two, three, five or other number.

The present invention has been described as being applied to the motorcycle but is applicable to a three-wheeled vehicle or a saddle-ride vehicle.

INDUSTRIAL APPLICABILITY

The present invention is suitable for a motorcycle.

REFERENCE SIGNS LIST

10 a saddle-type vehicle
12 a vehicle body frame
71 a rider's seat
86 an air bag apparatus
121 a retaining box
141 a lid
142 an opening portion
150 an air bag
151 lid restricting means (left link mechanism)
152 lid restricting means (right link mechanism)
158 a hinge portion
161 a lid stay
171 a left lid stay (left vertical arm)
172 right lid stay (right vertical arm)
177, 177B, 177C, 177D lid restricting means (strips)
181 a fastener
186 a fragile portion (slit)
187 a guide member (frictional guide member)

The invention claimed is:

1. An air bag apparatus for a saddle-ride type vehicle, comprising:
    a retaining box disposed on a vehicle body of the vehicle and located directly forward of a rider's seat;
    an air bag stored in the retaining box and configured to be deployed forward of a rider;
    a lid for closing an opening portion of the retaining box, the lid having a hinge portion formed on a rear side thereof for allowing the lid to pivot on the hinge portion during deployment of the air bag; and
    lid restricting means disposed between the lid and the retaining box for restricting an angle through which the lid pivots on the hinge portion away from the opening portion of the retaining box, the lid restricting means restricting the angle to less than 90 degrees relative to a road surface with the air bag apparatus carried on the vehicle.

2. The apparatus of claim 1, further comprising left and right lid stays integral with the lid, the lid restricting means being provided at each of the lid stays.

3. The apparatus of claim 2, wherein the lid stays are insert-molded into the lid.

4. The apparatus of claim 1, wherein the lid restricting means comprises a link mechanism.

5. The apparatus of claim 4, wherein the link mechanism includes:
    a lid stay;
    a first link extending from a first pivot on a side wall of the retaining box to a second pivot, wherein the first link is pivotable at the first pivot; and
    a second link extending from the second pivot to a third pivot on the lid stay, wherein the first link and the second link join and are pivotable at the second pivot, and the second link is pivotable at the third pivot.

6. The apparatus of claim 5, wherein the lid stay has a horizontal arm located below the lid and at least one vertical arm located outside of the retaining box, and the second link and the at least one vertical arm join and are pivotable at the third pivot.

7. The apparatus of claim 1, wherein the lid restricting means comprises a strip.

8. The apparatus of claim 7, wherein the strip includes a fragile portion formed longitudinally thereof, the apparatus further comprising a fastener holding one end of the fragile portion to the retaining box, the lid being pivotable away from the opening portion through a predetermined angle while allowing the fastener to break the fragile portion.

9. The apparatus of claim 7, wherein the strip extends inside the lid and between left and right sides of the lid, the apparatus further comprising a guide member disposed inside the lid and retaining the strip, the lid being pivotable away from the opening portion through a predetermined angle while allowing the strip to travel between the lid and the guide member.

10. The apparatus of claim 1, wherein the lid restricting means pivots on an outer lateral side wall of the retaining box during the deployment of the air bag.

* * * * *